(12) United States Patent
Matsushita et al.

(10) Patent No.: US 11,141,884 B2
(45) Date of Patent: Oct. 12, 2021

(54) RUBBER MIXING MACHINE CONTROL DEVICE, METHOD AND PROGRAM UTILIZING MACHINE LEARNING

(71) Applicant: MITSUBISHI HEAVY INDUSTRIES MACHINERY SYSTEMS, LTD., Hyogo (JP)

(72) Inventors: Yoichi Matsushita, Hiroshima (JP); Ryota Soga, Hiroshima (JP); Shinichi Noguchi, Hiroshima (JP); Koji Shintani, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 186 days.

(21) Appl. No.: 16/622,364

(22) PCT Filed: Jul. 6, 2017

(86) PCT No.: PCT/JP2017/024834
§ 371 (c)(1),
(2) Date: Dec. 13, 2019

(87) PCT Pub. No.: WO2019/008727
PCT Pub. Date: Jan. 10, 2019

(65) Prior Publication Data
US 2020/0198184 A1    Jun. 25, 2020

(51) Int. Cl.
  *G05B 13/02*  (2006.01)
  *G05B 13/04*  (2006.01)
  (Continued)

(52) U.S. Cl.
  CPC .............. *B29B 7/823* (2013.01); *B29B 7/28* (2013.01); *G05B 13/0265* (2013.01);
  (Continued)

(58) Field of Classification Search
  CPC ........... B29B 7/823; B29B 7/28; B29B 7/283; B29B 7/286; B29B 7/7495; B29B 7/90;
  (Continued)

(56) References Cited

U.S. PATENT DOCUMENTS 4,818,113 A    4/1989  Patel
7,004,616 B2 *  2/2006  Murakami ............ B29C 48/767
                                              366/75
(Continued)

FOREIGN PATENT DOCUMENTS

CN    102357934 A    2/2012
DE    112013003926 T5  5/2015
(Continued)

OTHER PUBLICATIONS

International Search Report and Written Opinion of International Application No. PCT/JP2017/024834 dated Sep. 26, 2017; 10 pp.

*Primary Examiner* — M. N. Von Buhr
(74) *Attorney, Agent, or Firm* — Kanesaka Berner & Partners

(57) ABSTRACT

The measured value of a rubber temperature parameter that is related to the temperature of a rubber material to be kneaded by a mixing machine 2 and measured values of correlation parameters that have a correlation with a change in the value of the rubber temperature parameter are acquired. The measured values are assigned to an operational control parameter-calculation model equation, which is modified from a rubber temperature parameter-calculation model equation including operational control parameters and the correlation parameters, and a constant and coefficients of the operational control parameters and the correlation parameters are calculated using a machine learning (Continued)

algorithm. A predetermined operational control parameter, which is required in a case in which the rubber temperature parameter is controlled to a predetermined value, is calculated using an operational control parameter-calculation equation that is specified by the coefficients and the constant calculated using the machine learning algorithm.

10 Claims, 5 Drawing Sheets

(51) Int. Cl.
  *B29B 7/28* (2006.01)
  *B29B 7/82* (2006.01)
  *G05D 23/19* (2006.01)
  *G06Q 50/04* (2012.01)
  *C08L 21/00* (2006.01)
  *B29B 7/74* (2006.01)

(52) U.S. Cl.
  CPC ....... *G05B 13/042* (2013.01); *G05D 23/1917* (2013.01); *G06Q 50/04* (2013.01); *B29B 7/283* (2013.01); *B29B 7/286* (2013.01); *B29B 7/7495* (2013.01); *C08L 21/00* (2013.01)

(58) Field of Classification Search
  CPC ....... B29B 7/183; B29B 7/20; G05B 13/0265; G05B 13/042; G05D 23/1917; G06Q 50/04; C08L 21/00; Y02P 90/30; B01F 15/00; B01F 15/00123; B01F 15/00279; B01F 15/00311; B01F 15/00331; B01F 15/00396; B01F 15/00129; B01F 15/00155; B01F 15/00162; B01F 15/00175; B01F 15/00201; B01F 15/00207
  See application file for complete search history.

(56) References Cited

U.S. PATENT DOCUMENTS

| | | | |
|---|---|---|---|
| 8,177,412 B2 * | 5/2012 | Murakami | B29C 48/57 366/75 |
| 9,528,914 B2 * | 12/2016 | Schumacher | G05B 17/02 |
| 10,018,997 B2 * | 7/2018 | Worek | G05B 19/41885 |
| 10,618,017 B2 * | 4/2020 | Ozawa | B01F 15/00292 |
| 2002/0070469 A1 * | 6/2002 | Hiatt | B29B 7/286 264/40.1 |
| 2013/0018141 A1 | 1/2013 | Oda et al. | |
| 2013/0090901 A1 | 4/2013 | Tsunoda et al. | |
| 2014/0249250 A1 | 9/2014 | Miyasaka | |
| 2015/0036449 A1 | 2/2015 | Ozawa et al. | |
| 2015/0138907 A1 | 5/2015 | Watanabe et al. | |
| 2020/0282371 A1 * | 9/2020 | Matsushita | B01F 7/00891 |

FOREIGN PATENT DOCUMENTS

| | | |
|---|---|---|
| JP | 58024404 A | 2/1983 |
| JP | 59002530 U | 1/1984 |
| JP | 59142125 A | 8/1984 |
| JP | 62132947 A | 6/1987 |
| JP | S6339305 A | 2/1988 |
| JP | 05138649 A | 6/1993 |
| JP | 06344334 A | 12/1994 |
| JP | 06344335 A | 12/1994 |
| JP | 07124942 A | 5/1995 |
| JP | 2005246785 A | 9/2005 |
| JP | 2005262725 A | 9/2005 |
| JP | 2008290350 A | 12/2008 |
| JP | 2013018212 A | 1/2013 |
| JP | 2013136707 A | 7/2013 |
| JP | 2013169667 A | 9/2013 |
| JP | 2013180494 A | 9/2013 |
| JP | 2015006759 A | 1/2015 |
| JP | 2015214119 A | 12/2015 |
| JP | 2016043486 A | 4/2016 |
| JP | 2017056666 A | 3/2017 |
| JP | 2017077649 A | 4/2017 |
| KR | 200333238 Y1 | 2/2004 |
| WO | 0124991 A1 | 4/2001 |

* cited by examiner

RUBBER MIXING MACHINE CONTROL DEVICE, METHOD AND PROGRAM UTILIZING MACHINE LEARNING

RELATED APPLICATIONS

The present application is a National Phase of International Application Number PCT/JP2017/024834 filed Jul. 6, 2017.

TECHNICAL FIELD

The present invention relates to a mixing machine control device, a mixing machine control method, and a program that control a mixing machine for kneading a rubber material.

BACKGROUND ART

There is a case where rubber and additives, such as silica and carbon, are input to a mixing machine during the manufacture of tires or other rubber products. The temperature of a rubber material containing the rubber and the additives needs to be appropriately controlled so that the rubber and the additives are kneaded more effectively in a kneading operation of the mixing machine. The related art is disclosed in PTL 1.

CITATION LIST

[PTL 1] Japanese Unexamined Patent Application Publication No. 2013-018212

SUMMARY OF INVENTION

Technical Problem

The related art of PTL 1 discloses a technique for automatically controlling the rotational speed of a stirring rotor by proportional-integral-differential (PID) control so that an actually measured temperature in a mixing chamber becomes a target temperature. Accordingly, in the case of the control of temperature using PID control, time is taken to calculate a rotational speed, which allows the internal temperature of the mixing chamber to be controlled to a desired temperature. Accordingly, there is a demand for a technique for more quickly and accurately controlling the temperature of a rubber material at the time of kneading.

Accordingly, an object of the invention is to provide a mixing machine control device, a mixing machine control method, and a program that solve the above-mentioned problem.

Solution to Problem

According to a first aspect of the invention, a mixing machine control device includes; a measured value-acquisition unit that acquires a measured value of a rubber temperature parameter related to a temperature of a rubber material to be kneaded by a mixing machine and measured values of correlation parameters, which have a correlation with a change in the value of the rubber temperature parameter caused by the kneading of the mixing machine and include at least operational control parameters of the mixing machine specified by correlation analysis; a machine learning unit that assigns the measured values to an operational control parameter-calculation model equation, which is modified from a rubber temperature parameter-calculation model equation including the operational control parameters and the correlation parameters and calculates a predetermined operational control parameter among the plurality of operational control parameters, and calculates a constant and coefficients of the operational control parameters and the correlation parameters by using a machine learning algorithm; and an operational control parameter-calculation unit that calculates the predetermined operational control parameter, which is required in a case in which the rubber temperature parameter is controlled to a predetermined value, by using an operational control parameter-calculation equation specified by the coefficients and the constant calculated using the machine learning algorithm.

In the above-mentioned mixing machine control device, the predetermined operational control parameter may be the number of rotations per unit time of a rotor of the mixing machine that kneads the rubber material, and the operational control parameter-calculation unit may calculate the number of rotations per unit time of the rotor, which is required in a case in which the rubber temperature parameter is controlled to a predetermined value, by using the operational control parameter-calculation equation that calculates the number of rotations per unit time of the rotor.

Further, in the above-mentioned mixing machine control device, the predetermined operational control parameter may be a cooling water temperature where the mixing machine cools the rubber material, and the operational control parameter-calculation unit may calculate the cooling water temperature, which is required in a case in which the rubber temperature parameter is controlled to a predetermined value, by using the operational control parameter-calculation equation that calculates the cooling water temperature.

Furthermore, in the above-mentioned mixing machine control device, the predetermined operational control parameter may be pressure of a ram of the mixing machine that presses the rubber material into a mixing chamber, and the operational control parameter-calculation unit may calculate the pressure of the ram, which is required in a case in which the rubber temperature parameter is controlled to a predetermined value, by using the operational control parameter-calculation equation that calculates the pressure of the ram.

Further, in the above-mentioned mixing machine control device, the predetermined operational control parameter may be the amount of cooling water that cools an object to be cooled in the mixing machine, and the operational control parameter-calculation unit may calculate the amount of the cooling water, which is required in a case in which the rubber temperature parameter is controlled to a predetermined value, by using the operational control parameter-calculation equation that calculates the amount of the cooling water.

Furthermore, in the above-mentioned mixing machine control device, the predetermined operational control parameter may be a moving distance of the ram of the mixing machine, which presses the rubber material into the mixing chamber, from a reference position, and the operational control parameter-calculation unit may calculate the moving distance of the ram from the reference position, which is required in a case in which the rubber temperature parameter is controlled to a predetermined value, by using the operational control parameter-calculation equation that calculates the moving distance of the ram from the reference position.

Further, in the above-mentioned mixing machine control device, the rubber temperature parameter may represent a ratio of a temperature change of the rubber material to a predetermined time.

Furthermore, in the above-mentioned mixing machine control device, the measured value-acquisition unit may acquire the measured value of the rubber temperature parameter and the measured values of the correlation parameters in each operation form for kneading the rubber material by the mixing machine, the machine learning unit may calculate a constant and coefficients of the operational control parameters and the correlation parameters that are required in a case corresponding to each operation form, and the operational control parameter-calculation unit may calculate the predetermined operational control parameter that is required in a case in which the rubber temperature parameter is controlled to a predetermined value in each operation form.

According to a second aspect, a mixing machine control method includes: acquiring a measured value of a rubber temperature parameter related to a temperature of a rubber material to be kneaded by a mixing machine and measured values of correlation parameters that have a correlation with a change in the value of the rubber temperature parameter caused by the kneading of the mixing machine and include at least operational control parameters of the mixing machine specified by correlation analysis; assigning the measured values to an operational control parameter-calculation model equation, which is modified from a rubber temperature parameter-calculation model equation including the operational control parameters and the correlation parameters and calculates a predetermined operational control parameter among the plurality of operational control parameters, and calculating a constant and coefficients of the operational control parameters and the correlation parameters by using a machine learning algorithm; and calculating the predetermined operational control parameter, which is required in a case in which the rubber temperature parameter is controlled to a predetermined value, by using an operational control parameter-calculation equation specified by the coefficients and the constant calculated using the machine learning algorithm.

According to a third aspect, a program allowing a computer of a mixing machine control device to function as: measured value-acquisition means for acquiring a measured value of a rubber temperature parameter related to a temperature of a rubber material to be kneaded by a mixing machine and measured values of correlation parameters that have a correlation with a change in the value of the rubber temperature parameter caused by the kneading of the mixing machine and include at least operational control parameters of the mixing machine specified by correlation analysis; machine learning means for assigning the measured values to an operational control parameter-calculation model equation, which is modified from a rubber temperature parameter-calculation model equation including the operational control parameters and the correlation parameters and calculates a predetermined operational control parameter among the plurality of operational control parameters, and calculating a constant and coefficients of the operational control parameters and the correlation parameters by using a machine learning algorithm; and operational control parameter-calculation means for calculating the predetermined operational control parameter, which is required in a case in which the rubber temperature parameter is controlled to a predetermined value, by using an operational control parameter-calculation equation specified by the coefficients and the constant calculated using the machine learning algorithm.

Advantageous Effects of Invention

According to the invention, it is possible to more quickly and accurately control the temperature of a rubber material that is kneaded in a mixing machine. Further, according to the invention, it is possible to easily calculate an operational control parameter of a mixing machine that is used to control the temperature of the rubber material.

DESCRIPTION OF EMBODIMENTS

A mixing machine control device according to an embodiment of the invention will be described below with reference to drawings.

Figure 1:
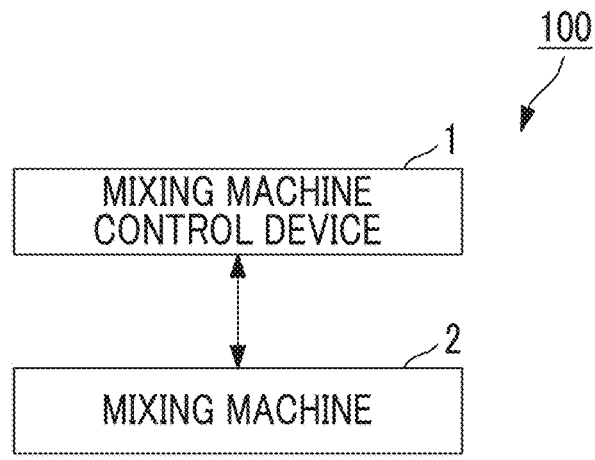
FIG. 1 is a block diagram showing the configuration of a mixing machine system including a mixing machine control device.

FIG. 1 is a block diagram showing the configuration of a mixing machine system 100 including a mixing machine control device according to the embodiment.

As shown in FIG. 1, the mixing machine system 100 is adapted so that a mixing machine control device 1 and a mixing machine 2 are connected to each other to communicate with each other. The mixing machine control device 1 may be included in the mixing machine 2. The mixing machine control device 1 is a computer that controls the mixing machine 2, and outputs command signals to the mixing machine 2. The mixing machine 2 controls objects to be driven on the basis of command signals obtained from the mixing machine control device 1. The objects to be driven are, for example, mixing rotors that form the mixing machine 2, or the like.

In this embodiment, the mixing machine 2 kneads rubber, silica, and other additives by rotating mixing rotors. A rubber material, which is kneaded by the mixing machine 2, is molded into a tire or other rubber products.

Figure 2:
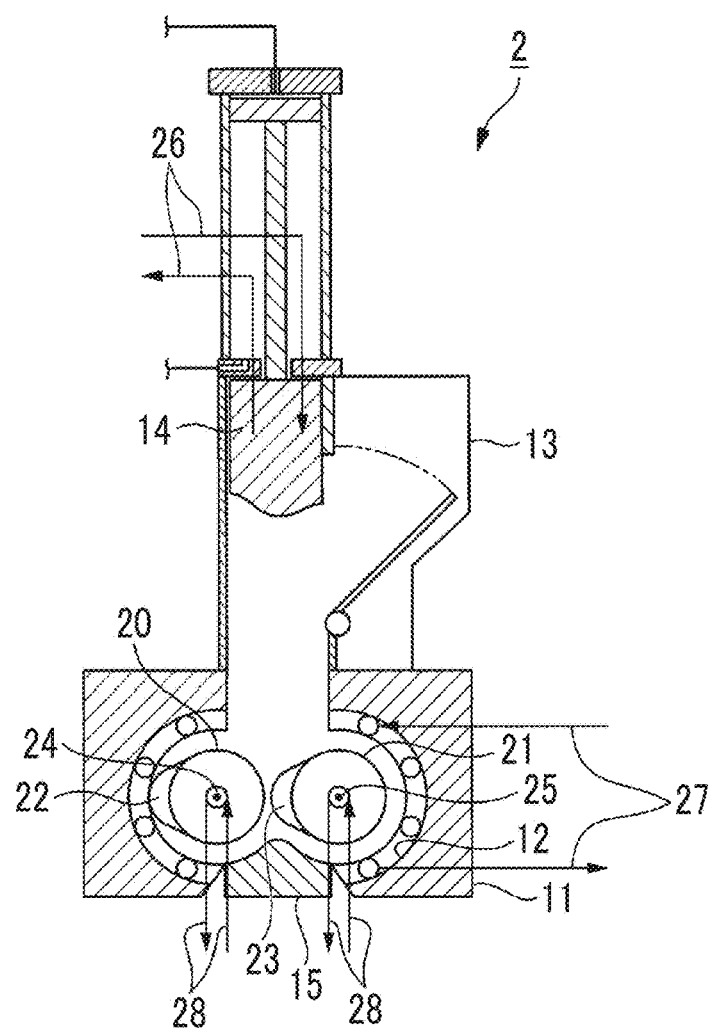
FIG. 2 is a schematic diagram of a mixing machine.

FIG. 2 is a schematic diagram of the mixing machine.

As shown in FIG. 2, the mixing machine 2 includes mixing rotors 20 and 21. In the mixing machine 2, a mixing chamber 12 is formed in a casing 11. In the mixing machine 2, a pair of mixing rotors 20 and 21 is disposed in the mixing chamber 12 so as to be parallel to each other. The pair of mixing rotors 20 and 21 is rotated in directions opposite to each other by a driving source, such as a motor (not shown). Further, blade portions 22 and 23, which protrude outward, are formed on the outer surfaces of the pair of mixing rotors 20 and 21, respectively. For example, the blade portions 22 and 23 are formed so as to be spiral around the axes 24 and 25 of the mixing rotors 20 and 21, respectively. These blade portions 22 and 23 are disposed so as to mesh with each other by the rotation of the mixing rotors 20 and 21.

The mixing machine 2 includes a hopper 13 and a ram 14 that are provided at the upper portion thereof. The hopper 13 communicates with the mixing chamber 12, and a rubber material including a rubber raw material, additives, and the like are input to the hopper 13. The ram 14 presses the rubber material, which is input to the hopper 13, into the mixing chamber 12.

Further, a drop door 15, which allows the kneaded rubber material to be taken to the outside, is mounted on the bottom portion of the mixing machine 2 so as to be openable and closable.

The mixing machine 2 presses the rubber material, which is input through the hopper 13, into the mixing chamber 12 by the ram 14.

Next, the mixing machine 2 kneads the rubber material by the meshing action of the mixing rotors 20 and 21 that are rotated in directions opposite to each other and a shearing action that occurs between the mixing rotors 20 and 21 and the inner surface of the mixing chamber 12.

Then, the mixing machine 2 takes the kneaded rubber material to the outside from the mixing chamber 12 by opening the drop door 15 that is provided on the bottom portion of the mixing chamber 12, and transports the kneaded rubber material to the other step.

The structure of the mixing machine 2 shown in FIG. 2 is exemplary, and the mixing machine 2 may have other structures. For example, the mixing machine 2 may be a mixing machine that kneads a rubber material by tangential rotors instead of a mixing machine that kneads a rubber material by the meshing of the blade portions 22 and 23 occurring through the rotation of the blade portions 22 and 23. Further, the mixing machine 2 may include a mechanism to which a rubber material is input from a slide-type opening/closing port, other than the hopper 13. Furthermore, the mixing machine 2 may be a kneader-type mixing machine that includes a mechanism for inverting a mixing tank instead of the drop door as a mechanism for discharging a kneaded rubber material.

Further, cooling water recirculates in the mixing machine 2 as shown in FIG. 2. Since a cooling water pipe is connected to the respective parts, such as the ram, the mixing chamber, and the rotors, and a flow channel is formed in each portion of the cooling water pipe, cooling water flows in the cooling water pipe. The cooling water pipe includes a first pipe 26 in which ram cooling water for cooling the ram recirculates, a second pipe 27 in which mixing chamber cooling water for cooling the mixing chamber recirculates, a third pipe 28 in which rotor cooling water for cooling the rotors recirculates, and the like.

Figure 3:
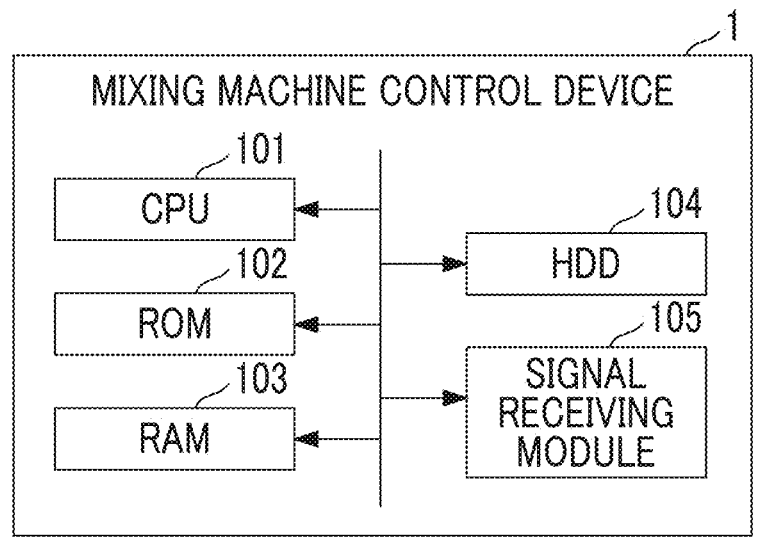
FIG. 3 is a diagram showing the hardware configuration of the mixing machine control device.

FIG. 3 is a diagram showing the hardware configuration of the mixing machine control device according to this embodiment.

As shown in FIG. 3, the mixing machine control device 1 is a computer that includes a central processing unit (CPU) 101, a read only memory (ROM) 102, a random access memory (RAM) 103, a hard disk drive (HDD) 104, and a signal receiving module 105.

Figure 4:
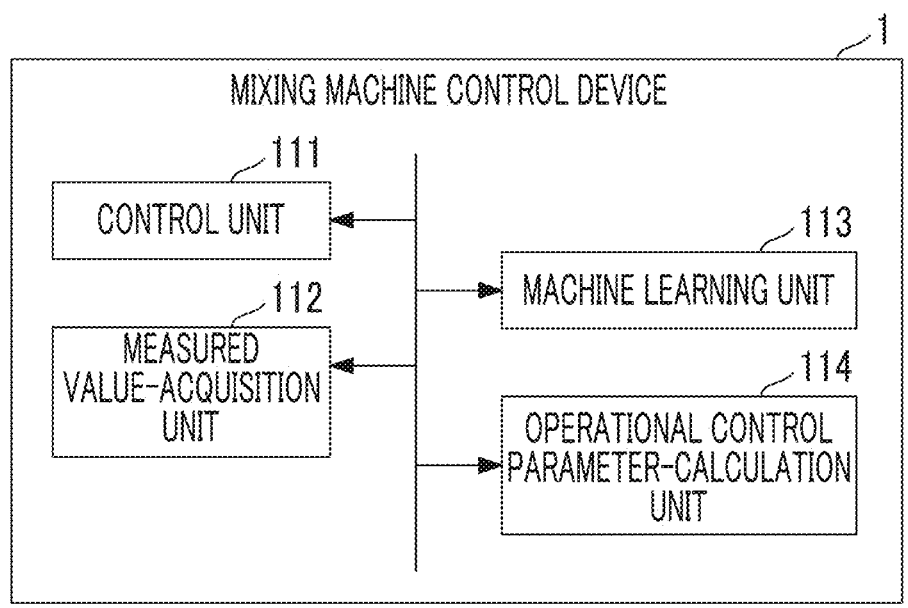
FIG. 4 is a functional block diagram of the mixing machine control device.

FIG. 4 is a functional block diagram of the mixing machine control device according to this embodiment.

The CPU 101 of the mixing machine control device 1 executes a program that is stored in the mixing machine control device 1 in advance. Accordingly, the mixing machine control device 1 includes the respective units, such as a control unit 111, a measured value-acquisition unit 112, a machine learning unit 113, and an operational control parameter-calculation unit 114.

The control unit 111 controls the respective functional units of the mixing machine control device 1.

The measured value-acquisition unit 112 acquires the measured value of a rubber temperature parameter that is related to the temperature of the rubber material to be kneaded by the mixing machine 2. Further, the measured value-acquisition unit 112 acquires the measured values of correlation parameters that have a correlation with a change in the value of the rubber temperature parameter caused by the kneading of the mixing machine 2 and include at least operational control parameters of the mixing machine specified by correlation analysis.

The machine learning unit 113 assigns the measured values to an operational control parameter-calculation model equation that is modified from a rubber temperature parameter-calculation model equation including the operational control parameters and the correlation parameters and calculates a predetermined operational control parameter among a plurality of operational control parameters. The machine learning unit 113 calculates a constant and coefficients of the operational control parameters and the correlation parameters by using a machine learning algorithm.

The operational control parameter-calculation unit 114 calculates the predetermined operational control parameter, which is required in a case in which the rubber temperature parameter is controlled to a predetermined value, by using an operational control parameter-calculation equation that is specified by the coefficients and the constant calculated using the machine learning algorithm.

In this embodiment, the predetermined operational control parameter is the number of rotations per unit time of the mixing rotors 20 and 21, which knead a rubber material, of the mixing machine 2. The predetermined operational control parameter, which is required in a case in which the rubber temperature parameter is controlled to a predetermined value, may be at least one or both of a cooling water-inlet temperature and ram pressure, and may be all of these three parameters. Cooling water is not water for directly cooling a rubber material, and is a medium for cooling the mixing chamber, the rotors, and the ram (flowing in the pipe and exchanging heat) to cool a rubber material.

The operational control parameter-calculation unit 114 calculates the number of rotations per unit time of the mixing rotors 20 and 21, which are required in a case in which the rubber temperature parameter is controlled to a predetermined value, by using a model equation for calculating the number of rotations per unit time of the mixing rotors 20 and 21. A rubber temperature parameter represents the rate of a temperature change T of a rubber material at a predetermined time t in this embodiment.

First Embodiment

Figure 5:
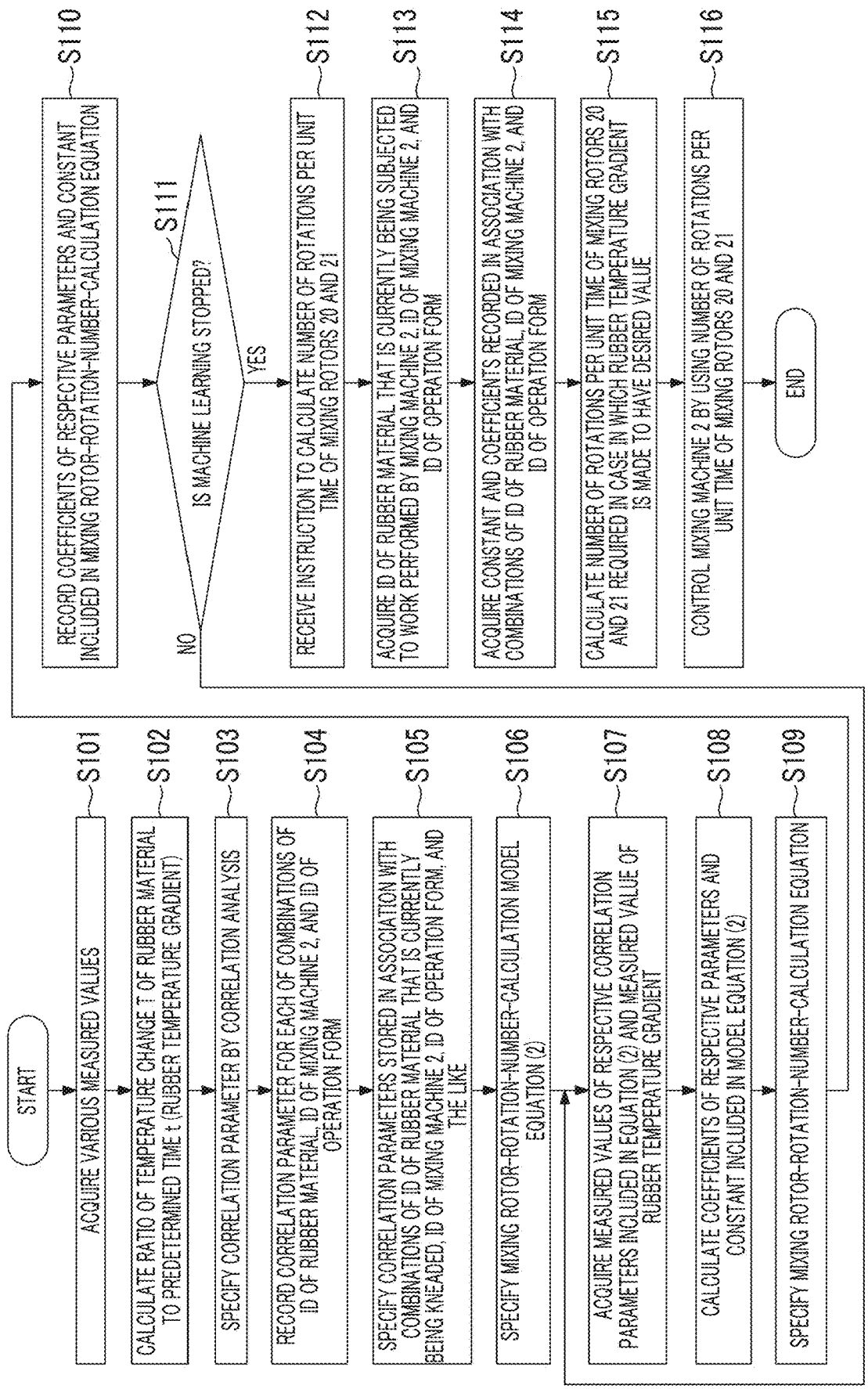
FIG. 5 is a chart showing the processing flow of a mixing machine control device according to a first embodiment.

FIG. 5 is a chart showing the processing flow of the mixing machine control device according to a first embodiment.

Next, the processing flow of the mixing machine control device according to the first embodiment will be described.

The measured value-acquisition unit 112 of the mixing machine control device 1 acquires various measured values from the mixing machine 2 during a control that the mixing machine 2 kneads a rubber material (Step S101). The measured values are the measured value of a rubber temperature parameter that is related to the temperature of a rubber material to be kneaded by the mixing machine 2, and the measured values of other operational control parameters or other acquired parameters. The operational control parameters are values that are input to the mixing machine 2 to operate the mixing machine 2. The rubber material includes a rubber raw material, silica, carbon, a coupling agent, and the like.

Specifically, the operational control parameters are the number of rotations per unit time of the mixing rotors 20 and 21, instantaneous power that is input to the mixing machine 2, integral power that is input to the mixing machine 2 at the current time, ram pressure, the position of the ram 14 (a ram lift distance that is the moving distance of the ram from a reference position), a cooling water-inlet temperature, the flow rate of cooling water, and the like. Further, the other acquired parameters include types of the respective materials that are contained in a rubber material, an operation form for kneading the rubber material in the mixing machine 2, a ratio of the volume of the rubber material to the volume of the mixing chamber 12, and the like. The values of some parameters of these operational control parameters and these acquired parameters may not be input from the mixing machine 2 and may be stored in a storage unit of the mixing machine control device 1 in advance.

The machine learning unit 113 calculates a ratio (T÷t) of a temperature change T of the rubber material to a predetermined time t on the basis of the temperature of the rubber material among the measured values that are acquired by the measured value-acquisition unit 112 (Step S102). The ratio (T÷t) of the temperature change T of the rubber material to a predetermined time t is an aspect of a rubber temperature parameter. Hereinafter, the ratio (T÷t) of the temperature change T of the rubber material to a predetermined time t will also be referred to as a rubber temperature gradient. The machine learning unit 113 specifies correlation parameters, which have a high correlation with a change in the value of the rubber temperature gradient, from the operational control parameters and other acquired parameters by correlation analysis. At least the number of rotations per unit time of the mixing rotors 20 and 21 are included as operational control parameters that are included in the correlation parameters. Any method, which is a publicly known technique, may be used as a method of correlation analysis. The machine learning unit 113 specifies a correlation parameter, which has a high correlation with a change in the value of the rubber temperature gradient, by correlation analysis for each of the combinations of the ID (identification information) of the mixing machine 2, the ID of a rubber material specifying a rubber material, and the ID of an operation form representing an operation form required in a case in which the mixing machine kneads a rubber material (Step S103).

The mixing machine 2 kneads a rubber material by a plurality of different operation forms in an operation for kneading a rubber material. An operation form for kneading a rubber material is specified by the combinations of timings at which a rubber raw material, silica, and other additives to be included in a rubber material are input to the mixing machine 2, the number of rotations per unit time of the mixing rotors 20 and 21, a mixing time, timings at which the position of the ram 14 is raised and lowered, and the like. Until the kneading of one rubber material is completed, the control of the mixing machine 2 is also performed by a plurality of operation forms, such as OPERATION FORM 1, OPERATION FORM 2, ..., OPERATION FORM n. In this embodiment, the mixing machine control device 1 can specify the control of the mixing machine 2, which is performed by one operation form or the combination of a plurality of operation forms, by the ID of an operation form.

The ID of the mixing machine 2 is ID that uniquely specifies the mixing machine 2 on the basis of the maker, type, and the like of the mixing machine 2.

The machine learning unit 113 records a correlation parameter, which has a high correlation with the value of the ratio of the temperature change of a rubber material (rubber temperature gradient), in the storage unit for each of the combinations of the ID of a rubber material, the ID of the mixing machine 2, and the ID of an operation form (Step S104). The specifying of the correlation parameters, which have a high correlation with the value of a rubber temperature gradient, according to the combinations of the ID of a rubber material, the ID of the mixing machine 2, and the ID of an operation form may be performed through calculation by an operation manager.

The measured value-acquisition unit 112 acquires identification information where the aspect of the manufacture of rubber can be specified, such as the ID of a rubber material that is currently being kneaded by the mixing machine 2, the ID of the mixing machine 2, and the ID of an operation form, during the actual manufacture of rubber. These kinds of information may be recorded in the storage unit of the mixing machine control device 1 in advance by an operation manager. The measured value-acquisition unit 112 specifies the correlation parameters that are stored in the storage unit in association with the combinations of the ID of a rubber material, the ID of the mixing machine 2, the ID of an operation form, and the like that have been acquired (Step S105). Accordingly, the measured value-acquisition unit 112 can recognize the correlation parameters that are based on the ID of a rubber material, the ID of the mixing machine 2, and the ID of an operation form. A rubber temperature parameter-calculation model equation (1) including the correlation parameters specified in Step S105 is expressed as follows.

RUBBER TEMPERATURE GRADIENT=CONSTANT'+COEFFICIENT 1'×RUBBER TEMPERATURE+COEFFICIENT 2'×INSTANTANEOUS POWER+COEFFICIENT 3'×INTEGRAL POWER+COEFFICIENT 4'×NUMBER OF ROTATIONS PER UNIT TIME OF MIXING ROTORS+ ... + ...　　(1)

The rubber temperature gradient expressed by the equation (1) is mainly changed on the basis of the operational control parameter among the correlation parameters included in the equation (1). Specifically, a correlation parameter, which significantly contributes to a change in the rubber temperature gradient, is a change in the number of rotations per unit time of the mixing rotors 20 and 21 among the operational control parameters. Accordingly, the mixing machine control device 1 performs processing by using a mixing rotor-rotation-number-calculation model equation (2) that is modified from the rubber temperature parameter-calculation model equation (1).

NUMBER OF ROTATIONS PER UNIT TIME OF MIXING ROTORS=CONSTANT+COEFFICIENT 1×RUBBER TEMPERATURE+COEFFICIENT 2×INSTANTANEOUS POWER+COEFFICIENT 3×INTEGRAL POWER+COEFFICIENT 4×RUBBER TEMPERATURE GRADIENT+ ... + ...　　(2)

Specifically, the machine learning unit 113 of the mixing machine control device 1 specifies the mixing rotor-rotation-number-calculation model equation (2), which includes the respective correlation parameters specified in Step S105, by modifying the model equation (1) (Step S106). The machine learning unit 113 specifies the number of rotations per unit time of the mixing rotors 20 and 21 included in the model equation (2), the respective correlation parameters including operational control parameters other than the number of rotations per unit time of the mixing rotors 20 and 21, and the measured value of the rubber temperature gradient on the basis of signals that are obtained from sensors mounted on the mixing machine 2 (Step S107). The machine learning unit 113 calculates the coefficients of the respective parameters and the constant on the basis of a relationship between the number of rotations per unit time of the mixing rotors 20 and 21 (objective variables) and a rubber temperature gradient or a correlation parameter (explanatory variable), which has a high correlation with a change in the value of the rubber temperature gradient, by using the measured values of the respective parameters specified in Step S107 and regression analysis using the model equation (2) (Step S108). Accordingly, the coefficients 1, 2, 3, 4, and the constant shown in the model equation (2) are calculated, and the machine learning unit 113 specifies a mixing rotor-rotation-number-calculation equation that determines the number of rotations per unit time of the mixing rotors 20 and 21 required in a case in which the rubber temperature gradient becomes a desired rubber temperature gradient (Step S109). The machine learning unit 113 may calculate the coefficients of the respective parameters and the constant that are included in the model equation (2) by using a machine learning method other than regression analysis.

The machine learning unit 113 repeats processing for calculating the coefficients of the respective parameters and the constant, which are included in the equation (2), for each of the combinations of the ID of a rubber material, the ID of the mixing machine 2, the ID of an operation form, and the like. The machine learning unit 113 records the coefficients of the respective parameters and the constant included in the mixing rotor-rotation-number-calculation equation, which is calculated for each of the combinations of the ID of a rubber material, the ID of mixing machine 2, the ID of an operation form, and the like, in the storage unit in association with ID indicating the combinations of the ID of a rubber material, the ID of the mixing machine 2, the ID of an operation form, and the like (Step S110).

The machine learning unit 113 determines whether to stop machine learning (Step S111). The machine learning unit 113 repeats the processing of Steps S107 to S111 until the machine learning is stopped, and acquires the number of rotations per unit time of the mixing rotors 20 and 21, the respective correlation parameters including operational control parameters other than the number of rotations per unit time of the mixing rotors 20 and 21, and the measured value of the rubber temperature gradient. Then, the machine learning unit 113 repeats processing for calculating the coefficients of the respective parameters and the constant that are included in the equation (2) by using a machine learning method, such as regression analysis.

Next, in a case in which a control is performed so that a ratio T÷t of a temperature change T of a rubber material, which is currently being kneaded by the mixing machine 2, to a predetermined time t (rubber temperature gradient) becomes a desired value, an operation manager inputs the value of the rubber temperature gradient (T÷t) to the mixing machine control device 1. Accordingly, the operation manager instructs the mixing machine control device 1 to calculate the number of rotations per unit time of the mixing rotors 20 and 21. The instruction of this calculation may be programmed in advance, so that the operational control parameter-calculation unit 114 may automatically calculate the number of rotations per unit time of the mixing rotors 20 and 21. For example, the operation manager may allow the mixing machine control device 1 to automatically calculate a target rubber temperature gradient by inputting a target rubber temperature and a time, which is taken until a temperature reaches a target temperature, to the mixing machine control device 1 instead of inputting the value of the rubber temperature gradient (T÷t) to the mixing machine control device 1 by the above-mentioned operation manager.

The operational control parameter-calculation unit 114 receives an instruction to calculate the number of rotations per unit time of the mixing rotors 20 and 21 (Step S112). The operational control parameter-calculation unit 114 acquires the ID of a rubber material that is currently being subjected to work performed by the mixing machine 2, the ID of the mixing machine 2, and the ID of an operation form, from the storage unit or the like (Step S113). The operational control parameter-calculation unit 114 acquires the coefficients of the respective parameters and the constant that are included in the equation (2) recorded in the storage unit in association with the combinations of the ID of a rubber material, the ID of the mixing machine 2, and the ID of an operation form (Step S114). The operational control parameter-calculation unit 114 assigns the value of the rubber temperature gradient (T÷t), which is input in the instruction to calculate the number of rotations in Step S112, and the measured values and calculated values (rubber temperature, instantaneous power, integral power, . . . and the like) of the other parameters, which are obtained in the current kneading operation of the mixing machine 2, to the mixing rotor-rotation-number-calculation equation that is specified by the acquired coefficients of the respective parameters and the acquired constant. Accordingly, the operational control parameter-calculation unit 114 calculates the number of rotations per unit time of the mixing rotors 20 and 21 required in a case in which the ratio T÷t of a temperature change T of a rubber material to a predetermined time t (rubber temperature gradient) becomes a desired value (Step S115).

The operational control parameter-calculation unit 114 controls the mixing machine 2 by using the number of rotations per unit time of the mixing rotors 20 and 21 that have been calculated (Step S116). Accordingly, the mixing machine 2 adjusts the number of rotations per unit time of the mixing rotors 20 and 21 on the basis of the control of the mixing machine control device 1, and performs an operation for kneading a rubber material. The temperature gradient of the rubber material, which is kneaded in the mixing machine 2, has a value that is desired by the operation manager.

According to the above-mentioned processing of the mixing machine control device 1, it is possible to specify the mixing rotor-rotation-number-calculation model equation (2) that can calculate the number of rotations per unit time of the mixing rotors 20 and 21 required in a case in which a rubber temperature gradient becomes a desired value by prior machine learning. Accordingly, the mixing machine control device 1 can immediately calculate the number of rotations per unit time of the mixing rotors 20 and 21 corresponding to the desired value of a rubber temperature gradient, and can control the number of rotations per unit time of the mixing rotors 20 and 21 of the mixing machine 2 so that the number of rotations per unit time of the mixing rotors 20 and 21 of the mixing machine 2 becomes the calculated value.

Further, according to the above-mentioned processing, it is possible to specify the mixing rotor-rotation-number-calculation model equation (2) that is calculated by machine learning for each of the combinations of the ID of a rubber material, the ID of the mixing machine 2, the ID of an operation form, and the like. Accordingly, the mixing machine control device 1 can immediately calculate the number of rotations per unit time of the mixing rotors 20 and 21 required in each of the cases corresponding to the ID of a rubber material that is being kneaded, the type of the mixing machine 2, and an operation form of the mixing machine 2.

Second Embodiment

In a second embodiment, the operational control parameter-calculation unit 114 calculates at least one of a cooling water-inlet temperature, the amount of cooling water, ram pressure, and a ram position, which allow a rubber temperature parameter to be controlled to a predetermined value, by using an operational control parameter-calculation equation that is specified by coefficients and a constant calculated using a machine learning algorithm. Each of the cooling water-inlet temperature, the amount of cooling water, the ram pressure, and the ram position is one of the predetermined operational control parameters.

Figure 6:
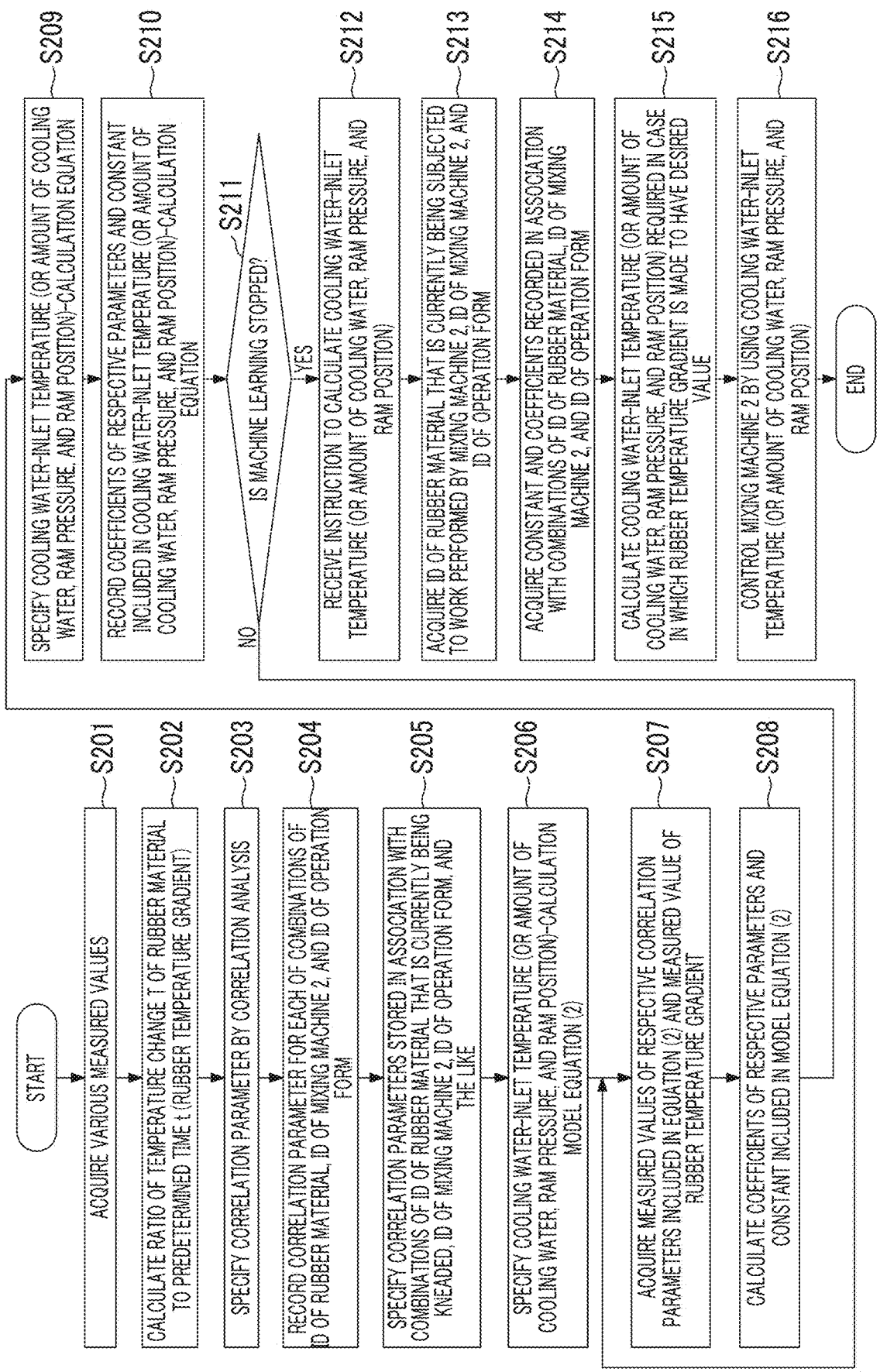
FIG. 6 is a chart showing the processing flow of the mixing machine control device according to a second embodiment.

FIG. 6 is a chart showing the processing flow of the mixing machine control device according to the second embodiment.

The measured value-acquisition unit 112 of the mixing machine control device 1 acquires various measured values from the mixing machine 2 during a control that the mixing machine 2 kneads a rubber material (Step S201). The measured values are the measured value of a rubber temperature parameter that is related to the temperature of a rubber material to be kneaded by the mixing machine 2, and the measured values of other operational control parameters or other acquired parameters. The operational control parameters are values that are input to the mixing machine 2 to operate the mixing machine 2. The rubber material includes a rubber raw material, silica, carbon, a coupling agent, and the like.

Specifically, the operational control parameters are the number of rotations per unit time of the mixing rotors 20 and 21, instantaneous power that is input to the mixing machine 2, integral power that is input to the mixing machine 2 at the current time, ram pressure, the position of the ram 14, the cooling water-inlet temperature of cooling water that flows in any one of first to third pipes 26 to 28 (an example of a cooling water temperature), the flow rate of cooling water, and the like. A difference between a cooling water-inlet temperature and a cooling water-outlet temperature or a cooling water-outlet temperature may be defined as the cooling water temperature. Further, the other acquired parameters include types of the respective materials that are contained in a rubber material, an operation form for kneading the rubber material in the mixing machine 2, a ratio of the volume of the rubber material to the volume of the mixing chamber 12, and the like. The values of some parameters of these operational control parameters and these acquired parameters may not be input from the mixing machine 2 and may be stored in the storage unit of the mixing machine control device 1 in advance.

The machine learning unit 113 calculates a ratio ($T \div t$) of a temperature change T of the rubber material to a predetermined time t on the basis of the temperature of the rubber material among the measured values that are acquired by the measured value-acquisition unit 112 (Step S202). The ratio ($T \div t$) of the temperature change T of the rubber material to a predetermined time t is an aspect of a rubber temperature parameter. Hereinafter, the ratio ($T \div t$) of the temperature change T of the rubber material to a predetermined time t will also be referred to as a rubber temperature gradient. The machine learning unit 113 specifies correlation parameters, which have a high correlation with a change in the value of the rubber temperature gradient, from the operational control parameters and other acquired parameters by correlation analysis. One of at least the number of rotations per unit time of the mixing rotors 20 and 21, the time transition of ram pressure from the start of kneading, the time transition of a cooling water-inlet temperature from the start of kneading control, the time transition of the amount of cooling water from the start of kneading control, and the time transition of a ram position from the start of kneading control is included as operational control parameters that are included in the correlation parameters. Any method, which is a publicly known technique, may be used as a method of correlation analysis. The machine learning unit 113 specifies a correlation parameter, which has a high correlation with a change in the value of the rubber temperature gradient, by correlation analysis for each of the combinations of the ID (identification information) of the mixing machine 2, the ID of a rubber material specifying a rubber material, and the ID of an operation form representing an operation form required in a case in which the mixing machine kneads a rubber material (Step S203).

The mixing machine 2 kneads a rubber material by a plurality of different operation forms in an operation for kneading a rubber material. An operation form for kneading a rubber material is specified by the combinations of timings at which a rubber raw material, silica, and other additives to be included in a rubber material are input to the mixing machine 2, the number of rotations per unit time of the mixing rotors 20 and 21, the time transition of ram pressure from the start of kneading, the time transition of a cooling water-inlet temperature from the start of kneading control, the time transition of the amount of cooling water from the start of kneading control, a kneading time, timings at which the position of the ram 14 is raised and lowered (the time transition of a ram position from the start of kneading control), and the like. Until the kneading of one rubber material is completed, the control of the mixing machine 2 is also performed by a plurality of operation forms, such as OPERATION FORM 1, OPERATION FORM 2, OPERATION FORM n. In this embodiment, the mixing machine control device 1 can specify the control of the mixing machine 2, which is performed by one operation form or the combination of a plurality of operation forms, by the ID of an operation form. The ID of the mixing machine 2 is ID that uniquely specifies the mixing machine 2 on the basis of the maker, type, and the like of the mixing machine 2.

The machine learning unit 113 records a correlation parameter, which has a high correlation with the value of the ratio of the temperature change of a rubber material (rubber temperature gradient), in the storage unit for each of the combinations of the ID of a rubber material, the ID of the mixing machine 2, and the ID of an operation form (Step S204). The specifying of the correlation parameters, which have a high correlation with the value of a rubber temperature gradient, according to the combinations of the ID of a rubber material, the ID of the mixing machine 2, and the ID of an operation form may be performed through calculation by an operation manager.

The measured value-acquisition unit 112 acquires identification information where the aspect of the manufacture of rubber can be specified, such as the ID of a rubber material that is currently being kneaded by the mixing machine 2, the ID of the mixing machine 2, and the ID of an operation form, during the actual manufacture of rubber. These kinds of information may be recorded in the storage unit of the mixing machine control device 1 in advance by an operation manager. The measured value-acquisition unit 112 specifies the correlation parameters that are stored in the storage unit in association with the combinations of the ID of a rubber material, the ID of the mixing machine 2, the ID of an operation form, and the like that have been acquired (Step S205). Accordingly, the measured value-acquisition unit 112 can recognize the correlation parameters that are based on the ID of a rubber material, the ID of the mixing machine 2, and the ID of an operation form. A rubber temperature parameter-calculation model equation (1) including the correlation parameters specified in Step S205 is expressed as follows.

RUBBER TEMPERATURE GRADIENT=CONSTANT'+COEFFICIENT 1'×RUBBER TEMPERATURE+COEFFICIENT 2'×INSTANTANEOUS POWER+COEFFICIENT 3'×INTEGRAL POWER+COEFFICIENT 4'×NUMBER OF ROTATIONS PER UNIT TIME OF MIXING ROTORS+ . . . + . . .     (1)

The rubber temperature gradient expressed by an equation (1) is mainly changed on the basis of the operational control parameter among the correlation parameters included in the equation (1). Specifically, a correlation parameter, which significantly contributes to a change in the rubber temperature gradient, may be a change in the number of rotations per unit time of the mixing rotors 20 and 21 among the operational control parameters, and may be a change in each of a cooling water-inlet temperature, the amount of cooling water, ram pressure, and a ram position. A case in which a correlation parameter significantly contributing to a change in the rubber temperature gradient is at least one of a cooling water-inlet temperature, the amount of cooling water, ram pressure, and a ram position will be described below. The mixing machine control device 1 performs processing by using a cooling water-inlet temperature (or ram pressure)-calculation model equation (3) that is modified from the rubber temperature parameter-calculation model equation (1).

COOLING WATER TEMPERATURE (OR AMOUNT OF COOLING WATER, RAM PRESSURE, RAM POSITION)=CONSTANT+ COEFFICIENT 1×RUBBER TEMPERATURE+ COEFFICIENT 2×INSTANTANEOUS POWER+COEFFICIENT 3×INTEGRAL POWER+COEFFICIENT 4×RUBBER TEMPERATURE GRADIENT+COEFFICIENT 5×NUMBER OF ROTATIONS PER UNIT TIME OF MIXING ROTORS+ . . .     (3)

Specifically, the machine learning unit 113 of the mixing machine control device 1 specifies a cooling water-inlet temperature (or the amount of cooling water, ram pressure, and a ram position)-calculation model equation (3), which includes the respective correlation parameters specified in Step S205, by modifying the model equation (1) (Step S206). The machine learning unit 113 specifies a cooling water-inlet temperature (or the amount of cooling water, ram pressure, and a ram position) included in the model equation (3), the respective correlation parameters including operational control parameters other than the cooling water-inlet temperature (or the amount of cooling water, the ram pressure, and the ram position), and the measured value of the rubber temperature gradient on the basis of signals that are obtained from sensors mounted on the mixing machine 2 (Step S207). The machine learning unit 113 calculates the coefficients of the respective parameters and the constant on the basis of a relationship between the cooling water-inlet temperature (or the amount of cooling water, the ram pressure, and the ram position) serving as an objective variable and a rubber temperature gradient or a correlation parameter, which has a high correlation with a change in the value of the rubber temperature gradient, serving as an explanatory variable, by using the measured values of the respective parameters specified in Step S207 and regression analysis using the model equation (3) (Step S208). Accordingly, the coefficients 1, 2, 3, 4, . . . and the constant shown in the model equation (3) are calculated, and the machine learning unit 113 specifies a cooling water-inlet temperature (or the amount of cooling water, ram pressure, and a ram position)-calculation equation that determines the time transition of a cooling water-inlet temperature (or the amount of cooling water, ram pressure, and a ram position) required in a case in which the rubber temperature gradient becomes a desired rubber temperature gradient (Step S209). The machine learning unit 113 may calculate the coefficients of the respective parameters and the constant that are included in the model equation (3) by using a machine learning method other than regression analysis.

The machine learning unit 113 repeats processing for calculating the coefficients of the respective parameters and the constant, which are included in the equation (3), for each of the combinations of the ID of a rubber material, the ID of the mixing machine 2, the ID of an operation form, and the like. The machine learning unit 113 records the coefficients of the respective parameters and the constant included in the cooling water-inlet temperature (or the amount of cooling water, ram pressure, and a ram position)-calculation equation, which is calculated for each of the combinations of the ID of a rubber material, the ID of mixing machine 2, the ID of an operation form, and the like, in the storage unit in association with ID indicating the combinations of the ID of a rubber material, the ID of the mixing machine 2, the ID of an operation form, and the like (Step S210).

The machine learning unit 113 determines whether to stop machine learning (Step S211). The machine learning unit 113 repeats the processing of Steps S207 to S211 until the machine learning is stopped, and acquires a cooling water-inlet temperature (or the amount of cooling water, ram pressure, and a ram position), the respective correlation parameters including operational control parameters other than the cooling water-inlet temperature (or the amount of cooling water, the ram pressure, and the ram position), and the measured value of the rubber temperature gradient. Then, the machine learning unit 113 repeats processing for calculating the coefficients of the respective parameters and the constant that are included in the equation (3) by using a machine learning method, such as regression analysis.

Next, in a case in which a control is performed so that a ratio T÷t of a temperature change T of a rubber material, which is currently being kneaded by the mixing machine 2, to a predetermined time t (rubber temperature gradient) becomes a desired value, an operation manager inputs the value of the rubber temperature gradient (T÷t) to the mixing machine control device 1. Accordingly, the operation manager instructs the mixing machine control device 1 to calculate a cooling water-inlet temperature (or the amount of cooling water, ram pressure, and a ram position). The instruction of this calculation may be programmed in advance, so that the operational control parameter-calculation unit 114 may automatically calculate a cooling water-inlet temperature (or the amount of cooling water, ram pressure, and a ram position). For example, the operation manager may allow the mixing machine control device 1 to automatically calculate a target rubber temperature gradient by inputting a target rubber temperature and a time, which is taken until a temperature reaches a target temperature, to the mixing machine control device 1 instead of inputting the value of the rubber temperature gradient (T÷t) to the mixing machine control device 1 by the above-mentioned operation manager.

The operational control parameter-calculation unit 114 receives an instruction to calculate a cooling water-inlet temperature (or the amount of cooling water, ram pressure, and a ram position) (Step S212). The operational control parameter-calculation unit 114 acquires the ID of a rubber material that is currently being subjected to work performed by the mixing machine 2, the ID of the mixing machine 2, and the ID of an operation form, from the storage unit or the like (Step S213). The operational control parameter-calculation unit 114 acquires the coefficients of the respective parameters and the constant that are included in the equation (2) recorded in the storage unit in association with the combinations of the ID of a rubber material, the ID of the mixing machine 2, and the ID of an operation form (Step S214). The operational control parameter-calculation unit 114 assigns the value of the rubber temperature gradient (T÷t) that is input in the instruction to calculate a cooling water-inlet temperature (or the amount of cooling water, ram pressure, and a ram position) in Step S212, and the measured values and calculated values (the number of rotations per unit time of the mixing rotors 20 and 21, a rubber temperature, instantaneous power, integral power, . . . and the like) of the other parameters in the current kneading operation of the mixing machine 2, to the cooling water-inlet temperature (or the amount of cooling water, ram pressure, and a ram position)-calculation equation that is specified by the acquired coefficients of the respective parameters and the acquired constant. Accordingly, the operational control parameter-calculation unit 114 calculates a cooling water-inlet temperature (or the amount of cooling water, ram pressure, and a ram position) required in a case in which the ratio T÷t of a temperature change T of a rubber material to a predetermined time t (rubber temperature gradient) becomes a desired value (Step S215). The operational control parameter-calculation unit 114 may calculate all of a cooling water-inlet temperature, the amount of cooling water, ram pressure, and a ram position, or a plurality of parameters among them.

The operational control parameter-calculation unit 114 controls the mixing machine 2 by using the calculated cooling water-inlet temperature (or the amount of cooling water, ram pressure, and a ram position) (Step S216). Accordingly, the mixing machine 2 adjusts a cooling water-inlet temperature (or the amount of cooling water, ram pressure, and a ram position) on the basis of the control of the mixing machine control device 1, and performs an operation for kneading a rubber material. The temperature gradient of a rubber material, which is kneaded in the mixing machine 2, has a value that is desired by the operation manager.

According to the above-mentioned processing of the mixing machine control device 1, it is possible to specify the cooling water-inlet temperature (or the amount of cooling water, ram pressure, and a ram position)-calculation model equation (3) that can calculate a cooling water-inlet temperature (or the amount of cooling water, ram pressure, and a ram position) required in a case in which a rubber temperature gradient becomes a desired value by prior machine learning. Accordingly, the mixing machine control device 1 can immediately calculate a cooling water-inlet temperature (or the amount of cooling water, ram pressure, and a ram position) corresponding to a desired value of a rubber temperature gradient, and can control the cooling water-inlet temperature, the amount of cooling water, the ram pressure, or the ram position of the mixing machine 2, all of these, or a plurality of parameters among these so that the cooling water-inlet temperature, the amount of cooling water, or the ram pressure, the ram position of the mixing machine 2, all of these, or a plurality of parameters among these have the calculated values.

Further, according to the above-mentioned processing, it is possible to specify the cooling water-inlet temperature (or the amount of cooling water, ram pressure, and a ram position)-calculation model equation (3) that is calculated by machine learning for each of the combinations of the ID of a rubber material, the ID of the mixing machine 2, the ID of an operation form, and the like. Accordingly, the mixing machine control device 1 can immediately calculate a cooling water-inlet temperature (or the amount of cooling water, ram pressure, and a ram position) required in each of the cases corresponding to the ID of a rubber material that is being mixed, the type of the mixing machine 2, and an operation form of the mixing machine 2. Further, the mixing machine control device 1 can easily calculate a cooling water-inlet temperature or the amount of cooling water, ram pressure, and a ram position that are the operational control parameters of the mixing machine 2 required to control a rubber temperature.

First Example

Figure 7:
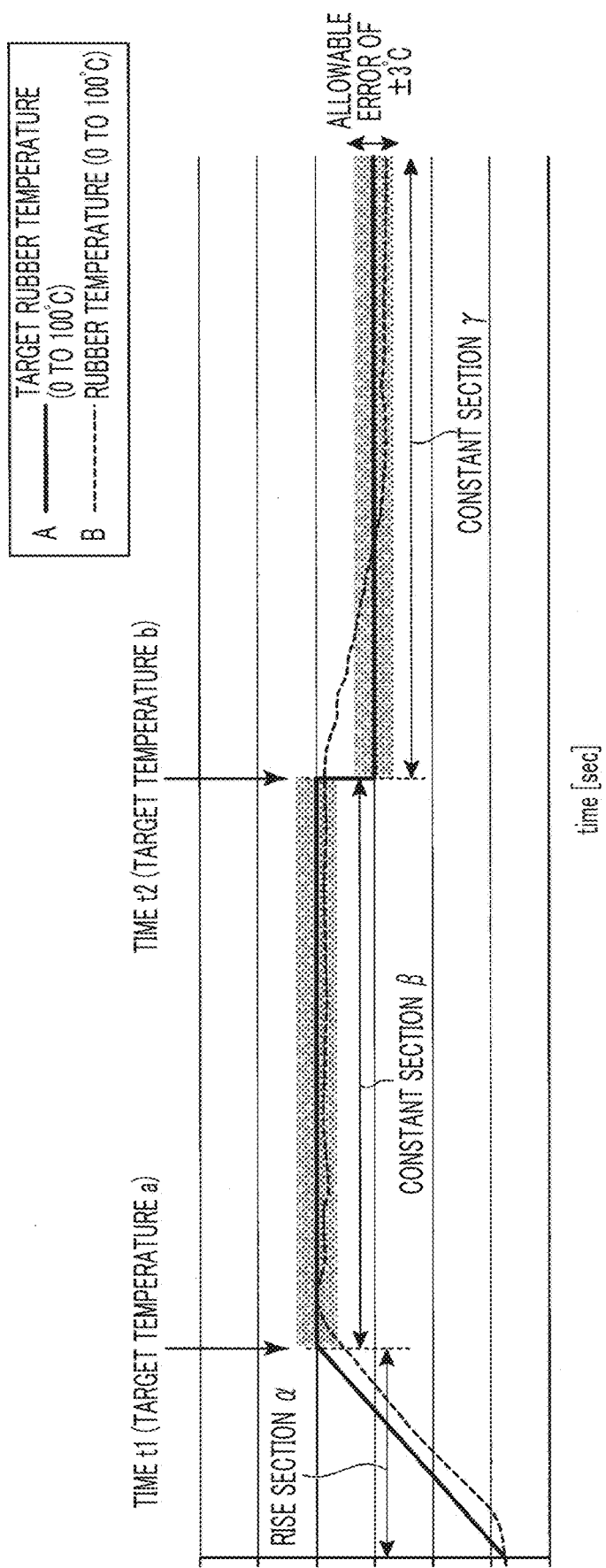
FIG. 7 is a graph showing the operation results of a mixing machine control device of a first example.

FIG. 7 is a graph showing the operation results of a mixing machine control device of a first example.

In FIG. 7, a solid line A indicates a target rubber temperature and a broken line B indicates a rubber temperature that is the control results of the mixing machine control device 1 according to the first embodiment.

As shown in FIG. 7, according to the control of the mixing machine control device 1 of the first embodiment, the measured value of the temperature of rubber, which is actually being mixed, can follow a target temperature in a rubber temperature-rise section α up to a time t1, a constant section β between the time t1 and a time t2, and a constant section γ after the time t2. Particularly, in the constant section β and the constant section γ, a rubber temperature could be made close to a target temperature within the range of an allowable error of ±3° C.

The above-mentioned mixing machine control device 1 includes a computer system therein. Further, a program, which allows the mixing machine control device 1 to perform the above-mentioned various kinds of processing, is stored in a computer-readable recording medium of the mixing machine control device 1, and the above-mentioned processing is performed in a case in which a computer of the mixing machine control device 1 reads and executes the program. Here, the computer-readable recording medium means a magnetic disk, a magneto-optical disk, a CD-ROM, a DVD-ROM, a semiconductor memory, or the like. Further, the computer program may be delivered to the computer through a communication line and the computer receiving the delivered program may execute the program.

Further, the program may be to realize a part of the functions of the above-mentioned processing units. Furthermore, the program may be a file that can be combined with the program already recorded in the computer system to realize the above-mentioned functions, that is, a so-called differential file (differential program).

INDUSTRIAL APPLICABILITY

The invention relates to a mixing machine control device, a mixing machine control method, and a program that control a mixing machine for mixing a rubber material.

REFERENCE SIGNS LIST

1: mixing machine control device
2: mixing machine
111: control unit
112: measured value-acquisition unit
113: machine learning unit
114: operational control parameter-calculation unit

The invention claimed is:

1. A mixing machine control device comprising:
a measured value-acquisition unit that acquires a measured value of a rubber temperature parameter related to a temperature of a rubber material to be mixed by a mixing machine and measured values of correlation parameters, which have a correlation with a change in the value of the rubber temperature parameter caused by the kneading of the mixing machine and include at least operational control parameters of the mixing machine specified by correlation analysis;
a machine learning unit that assigns the measured values to an operational control parameter-calculation model equation, which is modified from a rubber temperature parameter-calculation model equation including the operational control parameters and the correlation parameters and calculates a predetermined operational control parameter among the plurality of operational control parameters, and calculates a constant and coefficients of the operational control parameters and the correlation parameters by using a machine learning algorithm; and
an operational control parameter-calculation unit that calculates the predetermined operational control parameter, which is required in a case in which the rubber temperature parameter is controlled to a predetermined value, by using an operational control parameter-calculation equation specified by the coefficients and the constant calculated using the machine learning algorithm.

2. The mixing machine control device according to claim 1,
wherein the predetermined operational control parameter is the number of rotations per unit time of a rotor of the mixing machine that kneads the rubber material, and
the operational control parameter-calculation unit calculates the number of rotations per unit time of the rotor, which is required in a case in which the rubber temperature parameter is controlled to a predetermined value, by using the operational control parameter-calculation equation that calculates the number of rotations per unit time of the rotor.

3. The mixing machine control device according to claim 1,
wherein the predetermined operational control parameter is a cooling water temperature where the mixing machine cools the rubber material, and
the operational control parameter-calculation unit calculates the cooling water temperature, which is required in a case in which the rubber temperature parameter is controlled to a predetermined value, by using the operational control parameter-calculation equation that calculates the cooling water temperature.

4. The mixing machine control device according to claim 1,
wherein the predetermined operational control parameter is pressure of a ram of the mixing machine that presses the rubber material into a mixing chamber, and
the operational control parameter-calculation unit calculates the pressure of the ram, which is required in a case in which the rubber temperature parameter is controlled to a predetermined value, by using the operational control parameter-calculation equation that calculates the pressure of the ram.

5. The mixing machine control device according to claim 1,
wherein the predetermined operational control parameter is the amount of cooling water that cools an object to be cooled in the mixing machine, and
the operational control parameter-calculation unit calculates the amount of the cooling water, which is required in a case in which the rubber temperature parameter is controlled to a predetermined value, by using the operational control parameter-calculation equation that calculates the amount of the cooling water.

6. The mixing machine control device according to claim 1,
wherein the predetermined operational control parameter is a moving distance of the ram of the mixing machine, which presses the rubber material into the mixing chamber, from a reference position, and
the operational control parameter-calculation unit calculates the moving distance of the ram from the reference position, which is required in a case in which the rubber temperature parameter is controlled to a predetermined value, by using the operational control parameter-calculation equation that calculates the moving distance of the ram from the reference position.

7. The mixing machine control device according to claim 1,
wherein the rubber temperature parameter represents a ratio of a temperature change of the rubber material to a predetermined time.

8. The mixing machine control device according to claim 1,
wherein the measured value-acquisition unit acquires the measured value of the rubber temperature parameter and the measured values of the correlation parameters in each operation form for kneading the rubber material by the mixing machine,
the machine learning unit calculates a constant and coefficients of the operational control parameters and the correlation parameters that are required in a case corresponding to each operation form, and
the operational control parameter-calculation unit calculates the predetermined operational control parameter that is required in a case in which the rubber temperature parameter is controlled to a predetermined value in each operation form.

9. A mixing machine control method comprising:
acquiring a measured value of a rubber temperature parameter related to a temperature of a rubber material to be kneaded by a mixing machine and measured values of correlation parameters that have a correlation with a change in the value of the rubber temperature parameter caused by the kneading of the mixing machine and include at least operational control parameters of the mixing machine specified by correlation analysis;

assigning the measured values to an operational control parameter-calculation model equation, which is modified from a rubber temperature parameter-calculation model equation including the operational control parameters and the correlation parameters and calculates a predetermined operational control parameter among the plurality of operational control parameters, and calculating a constant and coefficients of the operational control parameters and the correlation parameters by using a machine learning algorithm; and calculating the predetermined operational control parameter, which is required in a case in which the rubber temperature parameter is controlled to a predetermined value, by using an operational control parameter-calculation equation specified by the coefficients and the constant calculated using the machine learning algorithm.

10. A non-transitory computer-readable storage medium having stored therein a program causing a computer to implement:

acquiring a measured value of a rubber temperature parameter related to a temperature of a rubber material to be kneaded by a mixing machine and measured values of correlation parameters that have a correlation with a change in the value of the rubber temperature parameter caused by the kneading of the mixing machine and include at least operational control parameters of the mixing machine specified by correlation analysis;

assigning the measured values to an operational control parameter-calculation model equation, which is modified from a rubber temperature parameter-calculation model equation including the operational control parameters and the correlation parameters and calculates a predetermined operational control parameter among the plurality of operational control parameters, and calculating a constant and coefficients of the operational control parameters and the correlation parameters by using a machine learning algorithm; and calculating the predetermined operational control parameter, which is required in a case in which the rubber temperature parameter is controlled to a predetermined value, by using an operational control parameter-calculation equation specified by the coefficients and the constant calculated using the machine learning algorithm.

* * * * *